United States Patent
Huh et al.

(10) Patent No.: US 7,561,528 B2
(45) Date of Patent: Jul. 14, 2009

(54) SYSTEM AND METHOD FOR CHANGING DURATION OF TALK BURST CONTROL TIMER

(75) Inventors: Kang-Suk Huh, Gyeonggi-Do (KR); Kyung-Ae Yoon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 573 days.

(21) Appl. No.: 11/197,431

(22) Filed: Aug. 5, 2005

(65) Prior Publication Data

US 2006/0034336 A1 Feb. 16, 2006

Related U.S. Application Data

(60) Provisional application No. 60/599,293, filed on Aug. 5, 2004, provisional application No. 60/600,805, filed on Aug. 12, 2004.

(30) Foreign Application Priority Data

| Sep. 1, 2004 | (KR) | .......... 10-2004-0069688 |
| Jul. 6, 2005 | (KR) | .......... 10-2005-0060912 |
| Jul. 14, 2005 | (KR) | .......... 10-2005-63844 |

(51) Int. Cl.
H04L 1/00 (2006.01)
(52) U.S. Cl. .......... 370/252; 370/260; 370/296; 370/395.2; 370/385; 455/90.2
(58) Field of Classification Search .......... 370/498, 370/487, 437, 260, 466, 296, 385, 395.2, 370/252; 455/90.2
See application file for complete search history.

(56) References Cited

U.S. PATENT DOCUMENTS

| 6,625,467 | B2 | 9/2003 | New et al. |
| 6,742,127 | B2 | 5/2004 | Fox et al. |
| 7,069,032 | B1* | 6/2006 | El-Fishawy .......... 455/517 |
| 7,170,863 | B1* | 1/2007 | Denman et al. .......... 370/260 |
| 2004/0190468 | A1* | 9/2004 | Saijonmaa .......... 370/312 |

(Continued)

FOREIGN PATENT DOCUMENTS

CN 1507226 A 6/2004

(Continued)

OTHER PUBLICATIONS

Comneon et al.; Signaling Flows ( NNI) V 2.07. ( Jun. 2004); pp. 1-135.*

(Continued)

*Primary Examiner*—Ricky Ngo
*Assistant Examiner*—Dewanda Samuel
(74) *Attorney, Agent, or Firm*—Birch, Stewart, Kolasch & Birch, LLP

(57) ABSTRACT

A system and method for changing a value of a talk burst control timer, are provided. According to an embodiment, there is provided a method of controlling a talk burst for at least one PT (push-to) client each having at least one talk burst control timer, the method comprising: providing, by a device management server or a PT server, at least one time value for the at least one talk burst control timer, to the at least one PT client, and updating the at least one talk burst control timer in the at least one PT client with the at least one time value.

2 Claims, 5 Drawing Sheets

U.S. PATENT DOCUMENTS

| | | | |
|---|---|---|---|
| 2004/0224710 A1* | 11/2004 | Koskelainen et al. | 455/518 |
| 2004/0249949 A1* | 12/2004 | Gourraud et al. | 709/227 |
| 2005/0124365 A1* | 6/2005 | Balasuriya et al. | 455/518 |
| 2005/0135348 A1* | 6/2005 | Staack | 370/353 |
| 2006/0039564 A1* | 2/2006 | Rao | 380/270 |
| 2006/0116151 A1* | 6/2006 | Sullivan et al. | 455/519 |
| 2007/0123284 A1* | 5/2007 | Schliwa-Bertling et al. | 455/518 |

FOREIGN PATENT DOCUMENTS

| | | |
|---|---|---|
| JP | 3006925 A | 1/1991 |
| JP | 7321811 A | 12/1995 |
| RU | 2003/104280 C1 | 6/2004 |
| WO | WO-2004/039002 | 5/2004 |

OTHER PUBLICATIONS

Comneon et al. Tansport Protocols V2.0.6 (Jun. 2004); pp. 1-39.*
Ericsson-Motorola-Nokia-Siemens; (Push-to-talk over Cellular (PoC) User Plane; pp. 2-37.*

* cited by examiner

```
SIP HEADERS
REQUIRE :              TIMER
SESSION-EXPIRES :      1800:REFRESHER=UAC
TALK BURST RELEASE TIMER   3
TALK BURST REQUEST TIMER   2
PTx CLIENT END RTP
MEDIA TIMER                1
```

```
SDP PARAMETERS
c=     IN IP6 57777::eee:fff:aaa:bbb
m=     AUDIO 57787 RTP/AVP 97
a=     RTPMAP:97 AMR
a=     RTCP:57000
m=     APPLICATION 57790 UDP TBCP
a=     FMTP:TBCP QUEUING: TB_PRIORITY=2: TIMESTAMP=1
```

FIG.5A

```
SIP HEADERS
REQUIRE :              TIMER
SESSION-EXPIRES :      1800:REFRESHER=UAC
```

```
SDP PARAMETERS
c=     IN IP6 57777::eee:fff:aaa:bbb
m=     AUDIO 57787 RTP/AVP 97
a=     RTPMAP:97 AMR
a=     RTCP:57000
m=     APPLICATION 57790 UDP TBCP
a=     FMTP:TBCP QUEUING: TB_PRIORITY=2: TIMESTAMP=1
a=     TALK BURST RELEASE TIMER=3
a=     TALK BURST RELEASE TIMER=2
a=     PTx CLIENT END RTP MEDIA TIMER=1
```

FIG.5B

SYSTEM AND METHOD FOR CHANGING DURATION OF TALK BURST CONTROL TIMER

This application claims the priority benefit of U.S. Provisional Application 60/599,293 filed on Aug. 5, 2004, U.S. Provisional Application No. 60/600,805 filed on Aug. 12, 2004, Korean Patent Application No. 10-2004-0069688 filed in Republic of Korea on Sep. 1, 2004, Korean Patent Application No. 10-2005-0060912 filed in Republic of Korea on Jul. 6, 2005, and Korean Patent Application No. 10-2005-0063844 filed in Republic of Korea on Jul. 14, 2005. The entire contents of each of these applications are hereby fully incorporated by reference.

BACKGROUND OF THE INVENTION

1. Field of the Invention

The present invention relates to a PT (push-to) service, and more particularly, to a mobile terminal, system and method for changing a duration of a talk burst control timer.

2. Description of the Related Art

A PT service is intended to provide rapid communications for business and consumers of mobile networks. The PT service can be a push to talk over cellular (PoC) for providing a call service by sending voice data, a push to view (PTV) for sending moving picture (video) data, or a communication service such as a push to data (PTD) for sending data. In a PT service system, a PT client (e.g., a client supporting a PT service) that wishes to transmit media data (voice, video, data, etc.) needs to first have an authority/permission to transmit the media data. Thus, prior to the actual transmission of the media data (talk burst), the PT client that wishes to transmit the media data transmits a request for a talk burst (a talk burst request message) to an associated PT server. Once the PT client receives the permission, then the PT client sends media data to one or more other PT clients with which a session has been established. The PT service allows user voice, moving picture and data communications to be shared with a single recipient (1-to-1) or between groups of recipients as in a group chat session (1-to-many), and uses a session initiation protocol (SIP) to establish a session.

Generally, the PT service system comprises a PT client for calling a PT service, and a PT server for sending voice, video and data between PT clients and controlling the transmission of talk bursts by using a talk burst control protocol (TBCP) so as to implement each type of PT services.

The PT client comprises at least one talk burst control timer for measuring a time duration after sending a talk burst control protocol (TBCP) message to the PT server, or receiving a TBCP message from the PT server, or performing a specific command. Each talk burst control timer has a specific duration (time) value set and fixed at the time of fabricating the PT service system or at the time of an initial operation, and the set time values of the talk but control timers are not varied thereafter according to the related art.

For example, a talk burst request timer (talk burst control timer) is started when a PT client sends a talk burst request message to its PT server. When the PT client receives a response to the talk burst request message from the PT server within the set time (duration) of the talk burst request timer, the talk burst request timer completes its operation. If the PT client does not receive a response to the talk burst request message from the PT server within the set time of the talk burst request timer, the PT client re-sends a talk burst request message and the talk burst request timer is initialized and started again at that time.

Since the set time value of such a talk burst control timer controls how long a PT client should wait before the PT client re-sends the talk burst request message, the set time value of the talk burst control timer greatly influences a quality of experience (QoE) that a PT service user feels, and a load of a network including the PT server which may increase or decrease according to the set time value of the talk burst control timer. For instance, more frequent retransmission of talk burst request messages will occur if the set time value of the talk burst request timer is small, which will increase network traffic and load.

A problem with such talk burst control timer of the related art is that it is operated with the fixedly set time value, always and without consideration of a network environment change. The talk burst control timer and the PT system according to the related art are not configured to consider and accommodate a current load circumstance of the network and thus the QoE is decreased. For instance, even if a current network condition requires minimum network load, a PT client resends the talk burst request message frequently according to the set time value of the talk burst control timer, which results in the decrease of QoE and worsens the network load condition.

Therefore, there is a need for a technique to change a time duration of a talk burst control timer, i.e., the value of the talk burst control timer. There is another need for a manager or a PT server to be able to change the value of the talk burst control timer with consideration of network environment. A procedure or a basis for changing the value of the talk burst control timer into an optimized value desired by the manager or the PT server is not provided in the related art.

SUMMARY OF THE INVENTION

Therefore, an object of the present invention is to provide a method and system for changing a time value (duration) of a talk burst control timer.

Another object of the present invention is to provide a method and system for changing a time value of a talk burst control timer by considering network environment.

Another object of the present invention is to provide a system and method for variably changing a time value of a talk burst control timer, capable of defining a procedure and a basis for changing the time value of the talk burst control timer into an optimized value.

Still another object of the present invention is to provide a system and method for changing a time value of a talk burst control timer, using a device management technique or without the use of a device management server.

Another object of the present invention is to provide a mobile terminal, system and method for variably setting a time value of one or more talk burst control timers, which overcome the limitations and disadvantages associated with the related art.

To achieve these and other advantages and in accordance with the purpose of the present invention, as embodied and broadly described herein, according to an aspect of the present invention there is provided a method of controlling a talk burst for at least one PT (push-to) client each having at least one talk burst control timer, the method comprising: providing, by a device management service or a PT server, at least one time value for the at least one talk burst control timer, to the at least one PT client, and updating the at least one talk burst control timer in the at least one PT client with the at least one time value.

According to another aspect of the present invention, there is provided a timer controlling method for a mobile terminal, the mobile terminal including a device management client and a PT (push-to) client, the device management client including a management object, the PT client including at least one talk burst control timer, the method comprising: receiving, by the device management client, at least one time value for the at least one talk burst control timer, updating the management object of the device management client with the at least one time value, and updating the at least one talk burst control timer of the PT client with the at least one time value.

According to another aspect of the present invention, there is provided a timer controlling method for a PT (push-to) client of a mobile terminal in a system, the mobile terminal including a device management client, the PT client including a talk burst request timer, the system including a PT server, a device management server, and an application management server authority, the method comprising: transmitting state information from the PT server to the application management server authority, determining, by the application management server authority, a time value for the talk burst request timer based on the state information, transmitting the time value from the application management server authority to the device management server, transmitting the time value from the device management server to the device management client through a session established between the device management server and the device management client, updating a management object of the device management client with the received time value, and updating a previously-set time value of the talk burst request timer of the PT client with the received time value.

According to another aspect of the present invention, there is provided a system for controlling a talk burst, the system comprising: a device management server, a PT (push-to) server, and at least one PT client, each PT client having at least one talk burst control timer and provided in a mobile terminal, wherein the at least one PT client receives at least one time value for the at least one talk burst control timer from the device management server or the PT server, and the at least one talk burst control timer in the at least one PT client is updated with the at least one time value.

According to another aspect of the present invention, there is provided a mobile terminal for providing a PT (push-to) service, the mobile terminal comprising: a device management client including a management object, and a PT client including at least one talk burst control timer, wherein the device management client receives at least one time value for the at least one talk burst control timer, and updates the management object with the at least one time value, and wherein the at least one talk burst control timer of the PT client is updated with the at least one time value.

According to another aspect of the present invention, there is provided a system for changing a value of a talk burst control timer, the system comprising: a PT (push-to) client including at least one talk burst control timer, a device management server to transmit a time value for the at least one talk burst control timer to a device management client; and the device management client including a management object for applying the time value received from the device management server to the at least one talk burst control timer of the PT client.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5A and 5B are two different examples of a SIP message usable in the method of FIG. 4 according to the second embodiment of the present invention;

DETAILED DESCRIPTION OF THE PREFERRED EMBODIMENTS

Reference will now be made in detail to the preferred embodiments of the present invention, examples of which are illustrated in the accompanying drawings.

Hereinafter, a system and method for changing a time value of at least one talk burst control timer according to the present invention will be explained as follows.

The present invention provides a technique for changing the value of one or more talk burst control timers. For each talk burst request timer, the time value (parameter) initially or previously set for that talk burst request timer is updated with a new value. One, a group, or all of the talk burst request timers in a PT client can be updated at the same time or at different times. A new time value for one talk burst request timer can be the same as or different from a new time value for another talk burst request timer. This time value updating operation for each talk burst request timer can occur continuously, periodically, or as needed.

According to the first embodiment, the time value of a talk burst control timer is changed into a new value using a device management server, i.e., using a device management (DM) provisioning method. The new value can be determined by considering network environment. In the second embodiment, the time value of the talk burst control timer is updated using a session initiation protocol (SIP) message or a real-time transport control protocol (RTCP) message, without using the device management. In the first embodiment, the device management server provides the new time values (received from an application management server authority) to the mobile terminal, whereas in the second embodiment, the PT server provides the new time values (determined by the PT server) to the mobile terminal.

Figure 1:
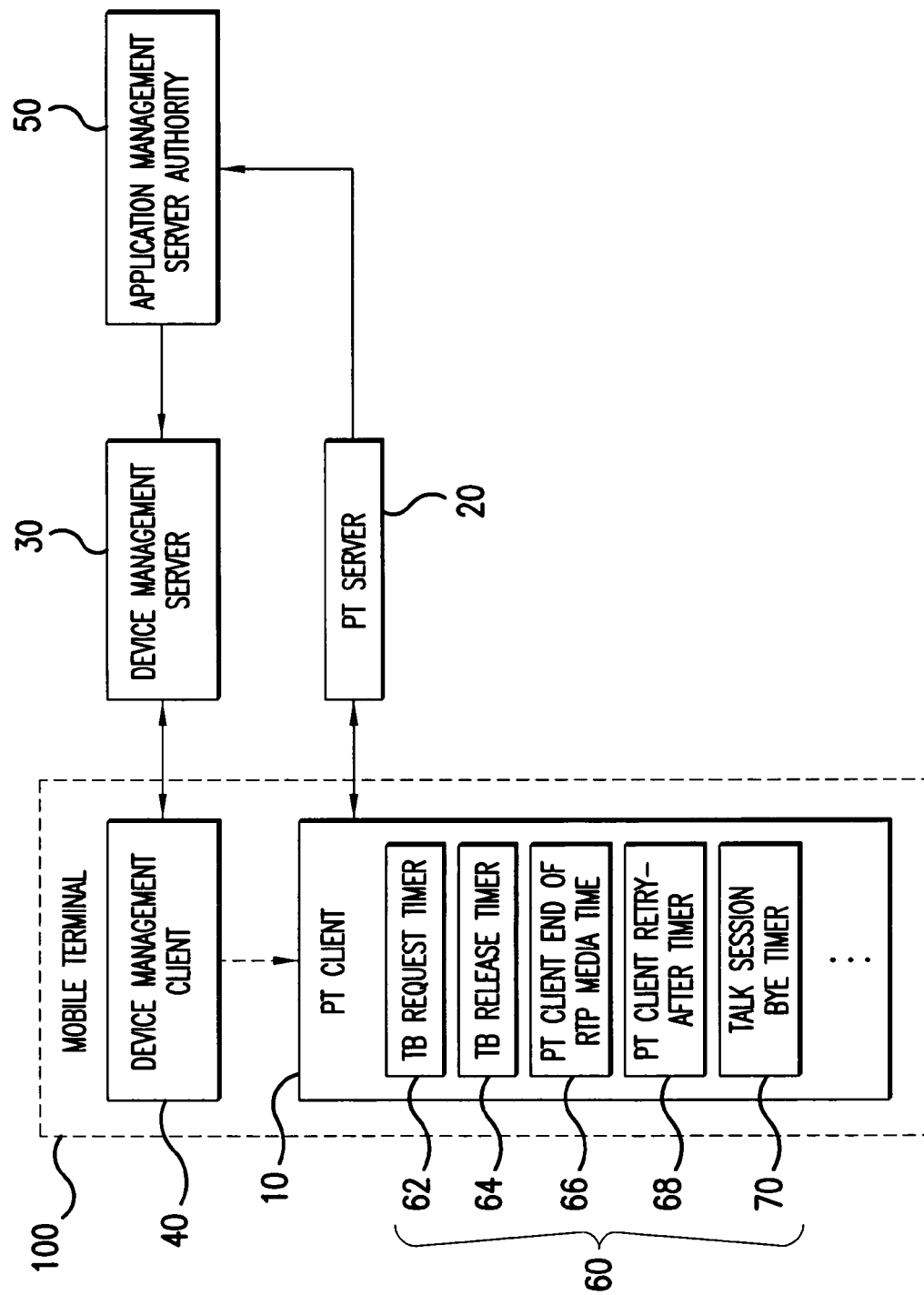
FIG. 1 is a block diagram showing a system for changing a time value of at least one (one or more) talk burst control timers according to a first embodiment of the present invention.

FIG. 1 is a block diagram showing a system for changing a time value of at least one talk burst control timer according to the first embodiment of the present invention.

Referring to FIG. 1, the system comprises at least one mobile terminal 100 each including a PT client 10 and a device management (DM) client 40, a PT server 20 for controlling the sending of voice, video and data between the PT clients 10 and controlling talk bursts in order to implement PT services, a device management (DM) server 30, and an application management server authority 50, all operatively coupled. The mobile terminal 100 communicates with the PT server 20 and the DM server 30 using known techniques through known communication channels.

The PT client 10 includes a plurality of talk burst control timers 60 and other components to provide PT services. The talk burst control burst timers 60 can be, but are not limited to, a talk burst request timer 62, a talk burst release timer 64, a PT client end of RTP (real-time transport protocol) media timer 66, a PT client retry-after timer 68, and a talk session BYE timer 70.

According to the first embodiment, the time value of each of the talk burst control timers 60 is separately and variably set through the device management client server 30 based on network environment conditions. In this regard, the application management server authority 50 calculates a new time value of at least one talk burst control timer 60 by receiving talk bursts, each kind of data for controlling the talk bursts from the PT server 20, and/or network load information, analyzing and judging the received information and data, and determining a new time value of at least one talk burst control timer as needed based on the analysis result. In this regard, the application management server authority 50 can be computer software embodied on computer-readable medium, in which the system automatically determines optimum time values of the talk burst control timers based on current network conditions, or can be a person (or a group of individuals) who reviews the network condition information and determines optimum time values based that information. The process of determining the optimum timer values will be discussed later in more detail.

The application management server authority 50 provides the newly determined time value(s) of the talk burst control timer(s) to the device management server 30, which in turn transmits them to the device management client 40. The device management server 40 receives the new time value(s), updates its records with the new time value(s), and changes the previously-set time value(s) of the talk burst control timer (s) to the new time value(s). Then the PT client 10 controls the talk burst and other operations based on the newly-set time value(s) of the talk burst control timer(s). This time value varying operation can occur periodically or at certain desired intervals or times or events.

Among the talk burst control timers 60, the talk burst request timer 62 is a timer associated with a transmission of a talk burst request message requesting a talk burst. When the PT client 10 transmits a talk burst request message to the PT server 20, the talk burst request timer 62 is started. If the PT client 10 does not receive a response to the sent talk burst request message within the time indicated in the set time value of the talk burst request timer 62 (i.e., if the timer 62 expires), then the PT client 10 retransmits the talk burst request message and at the same time, initializes and re-starts the talk burst request timer 62.

The talk burst release timer 64 is started when the PT client 10 sends a talk burst release message. The PT client end of RTP media timer 66 is started whenever an RTP packet is received from the PT server 20, and judges whether the sending of the RTP packet is completed. The PT client retry-after timer 68 is started when a talk burst revoke message having a retry-after field value not equal to '0' is received from the PT server 20, and prevents a user from sending an RTP packet. The talk session BYE timer 70 is started when the mobile terminal 100 sends a real-time transport control protocol (RTCP) BYE packet in order to finish a person talk session or a group talk session.

According to the first embodiment, a session between the device management server 30 and the device management client 40 has to be established so that the device management server 30 can inform new time value(s) of the talk burst control timer(s) 60 to the device management client 40. The session establishment between the device management server 30 and the device management client 40 comprises informing the device management client 40 of a device management request for a specific management object by the device management server 30, starting a session with the device management server 30 by the device management client 40, and establishing a management session with the device management client 40 by the device management server 30.

Figure 2:
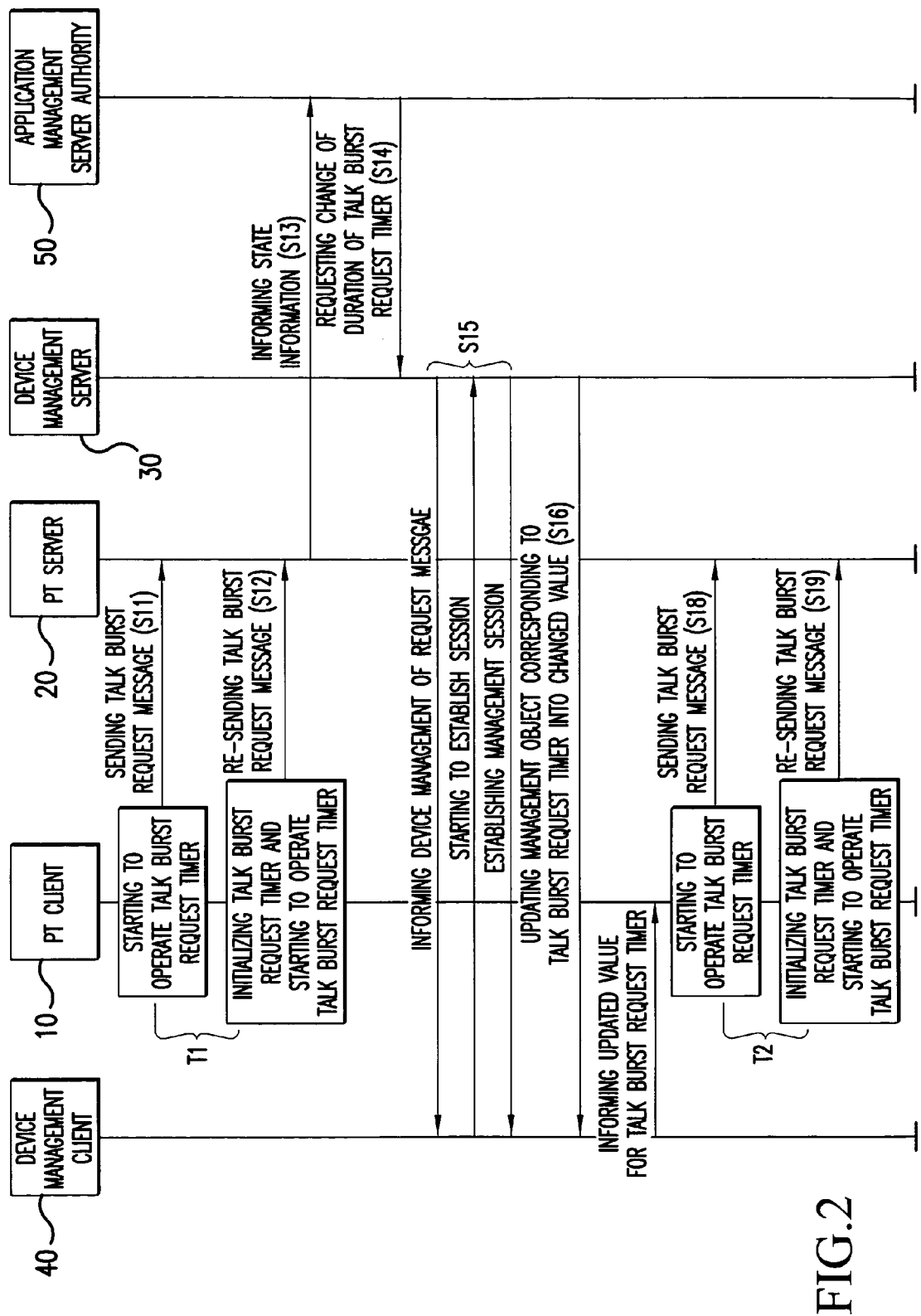
FIG. 2 is a flowchart showing a method for changing a time value of at least one talk burst control timer according to the first embodiment of the present invention.

FIG. 2 is a flowchart showing a method for changing a time value of at least one talk burst control timer according to the second embodiment of the present invention. More specifically, FIG. 2 shows a method of changing a time value of the talk burst request timer 62 as an example; however, the steps are equally applicable to changing other talk burst request timers. The method of FIG. 2 is implemented in the system of FIG. 1, but can be implemented in other suitable system.

Referring to FIG. 2, when the PT client 10 sends a talk burst request message to the PT server 20, the talk burst request timer 62 is started (S11). In that case, the currently-set time value of the talk burst request timer 62 is referred to as T1.

When the PT client 10 does not receive a response to the talk burst request message from the PT server 20 within T1, the talk burst request timer 62 is initialized and the PT client 10 re-sends the talk burst request message to the PT server 20 (S12). That is, if the response to the previously-sent talk burst request message is received within T1, the PT client 10 judges that the talk burst request message has been received in the PT server 20. But, if the response to the talk burst request message is not received within T1, the PT client 10 judges that the talk burst request message has been lost or delayed and thereby re-sends a talk burst request message.

The PT server 20 provides the application management server authority 50 with network environment information (e.g., talk burst information, state information) for controlling the talk burst, periodically or at certain times (S13). The application management server authority 50 examines the received information and determines if the currently-set time value of the timer 62 should be changed upon considering the network environment information. If so, the application management server authority 50 calculates or determines a new time value and then sends a request message for changing the time value of the timer 62 to the device management server 30 (S14). This request message includes the new time value of the timer 62. In a case where one or more time values of the timers 60 are determined, then the request message may include all of them.

The device management server 30 communicates this request message to the device management client 40, and then establishes a session for informing a corresponding management object of the device management client 40 the new time value (S15). In the alternative, the session between the device management server 30 and the device management client 40 may be established at the time of an initial PT service.

When the session between the device management server 30 and the device management client 40 is established, the device management server 30 informs, the corresponding management object of the device management client 40, of the new time value of the talk burst request timer 62, and thus the management object is updated accordingly (S16). That is, the parameter in the management object that indicates the time value of the talk burst request timer 62 is set to the new time value. General use and structure of the management object of the device management client 40 for providing PT services are known. For instance, the management object of the device management client 40 is used for continuous provisioning to update service configurations. In this regard, the newly determined time value(s) of the talk burst request timer (s) 60 can be part of the parameters to be provisioned by the service provider, in order to provide continuous PT services. That is, the time value(s) of the talk burst request timer(s) 60 is updated using the device management provisioning method.

The device management client 40 also informs the PT client 10 of the new time value of the talk burst request timer 62 and thus the time value of the talk burst request timer 62 in the PT client 10 is set to equal the new time value (S17). Then the PT client 10 conducts the retransmission of a talk burst request message to the PT server 20 according to the updated time value (T2) of the talk burst request timer 62 (S18).

If a response to the retransmitted talk burst request message is not received within T2, the talk burst request timer 62 is initialized and re-started and the PT client 10 retransmits the talk burst request message to the PT server 20 (S19).

In the first embodiment of the present invention, the application management server authority 50 calculates a new time value of a specific talk burst control timer or new duration values of at least one talk burst control timers with consideration of the network environment information, in order to change the time value(s) of the talk burst control timer(s) to actively correspond to the network environment change. To do so, network environment information is collected by the PT server and then a new time value of at least one talk burst control timers is determined based on the network environment information. The network environment information includes state information pertaining to states of the network, PT client(s) and/or PT server, etc. The state information includes information on status/states of one or more PT clients and/or their associated PT server. For instance, the state information includes the load information of the PT server and/or the quality of experience (QoE) of the PT client(s).

According to one example, the time value of at least one talk burst control timer is determined with consideration of one or more of the following: a first quality of experience (QoE1), a second quality of experience (QoE2), a third quality of experience (QoE3), a fourth quality of experience (QoE4), and a turn around time (TaT). The first quality of experience QoE1 denotes a duration between the time when a PT subscriber initiates a PT session and the time when he has a permission to send the talk burst. The second quality of experience QoE2 denotes a duration between the time when a PT participant send a talk burst request message and the time when he starts to send the talk burst. The third quality of experience QoE3 denotes a duration between the time when one PT participant having a permission to send the talk burst starts to send the talk burst and the time when another PT participant starts to receive the talk burst. The fourth quality of experience QoE4 corresponds to a voice quality such as an end-to-end channel delay, transmit and receive levels, codec characteristics, RF channel conditions, and an echo. Also, the fourth quality of experience QoE4 denotes a duration between the time when a PT participant releases the permission to send the talk burst and the time when he starts to receive the talk burst sent by anther PT participant, etc.

The process of determining or calculating new time value (s) of the timer(s) 60 may be accomplished in a variety of different ways. For instance, the application management server authority 50 may give certain weights to a set of preselected criteria including the first to fourth quality of experiences QoE1-QoE4, such that the new timer value results in an optimum network condition or an optimum talk burst operation. Look-up tables can be provided with a possible new time value or range for each of the talk burst control timers under a number of different network conditions, and if a range is given, then the server authority 50 can select a value from the range. For instance, a look-up table may provide what the new time value for the talk burst request timer should be given that, e.g., QoE1-QoE4 have certain values. Certain mathematical equation(s) may also be derived in advance for determining the new time value for each talk burst control timer with variables reflecting the network environment information such as QoE values. If the authority 50 is an individual, then the looking up of the appropriate tables and/or using the equations, etc. may be performed manually or using computer software. If the authority 50 is the system, then computer programs can be implemented to automatically determine the new timer value(s) based on the input values, e.g., QoE, network load amount, etc.

Figure 3:
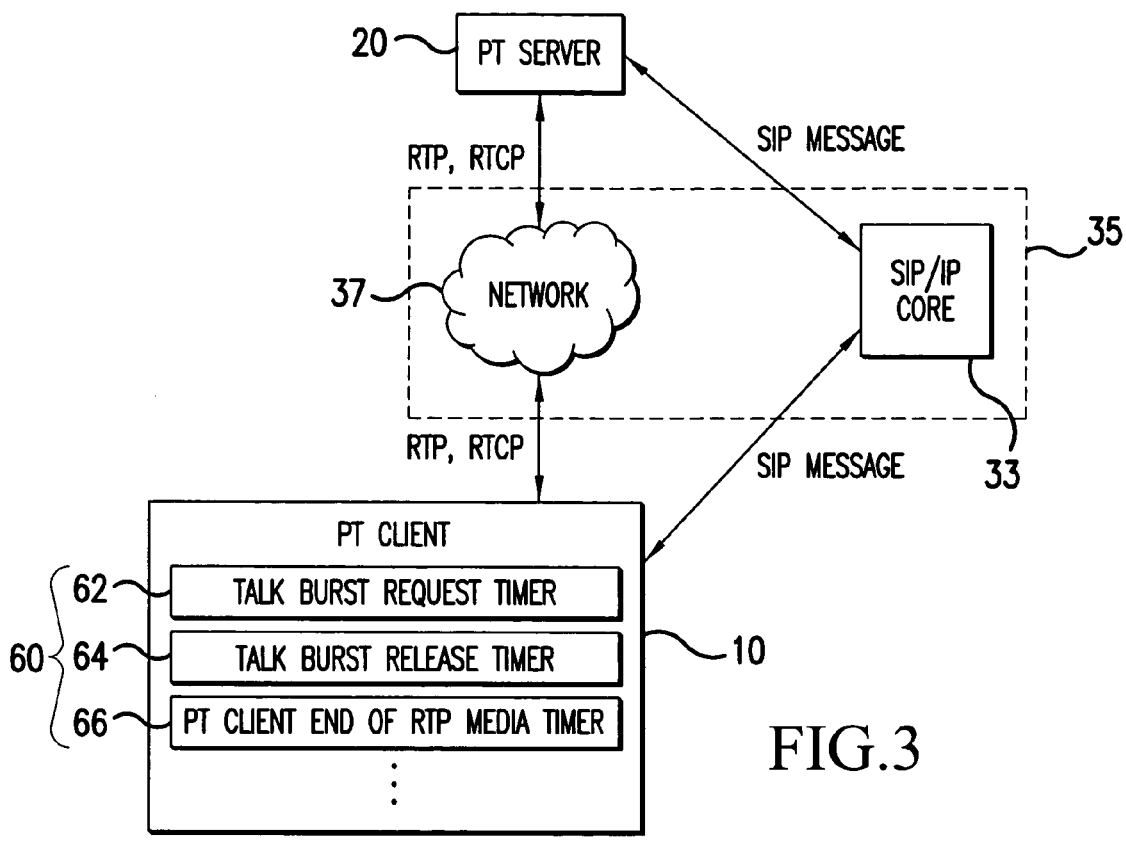
FIG. 3 is a block diagram showing a system for changing a time value of at least one talk burst control timer according to a second embodiment of the present invention.
Figure 4:
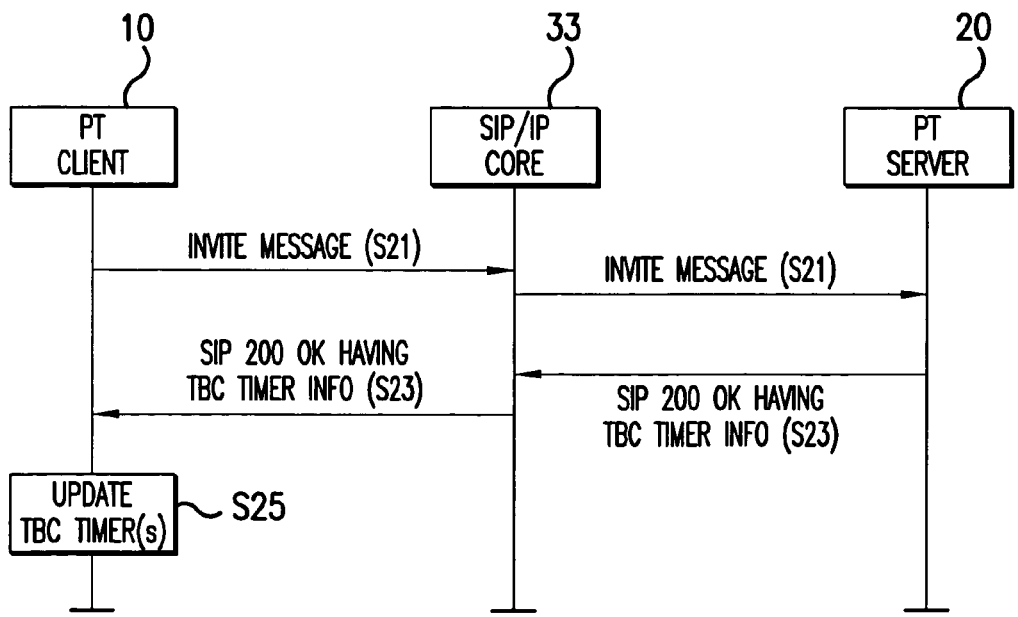
FIG. 4 is a signal chart showing one example of a method for changing a time value of at least one talk burst control timer according to the second embodiment of the present invention.
Figure 6:
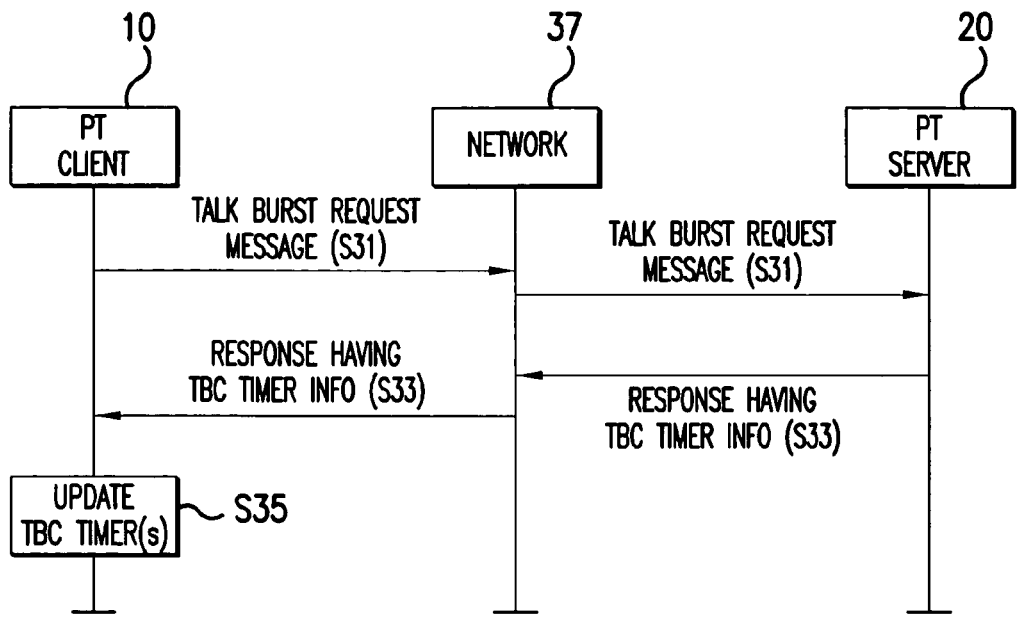
FIG. 6 is a flowchart showing another example of a method for changing a time value of at least one talk burst control timer according to the second embodiment of the present invention.
Figure 7A:
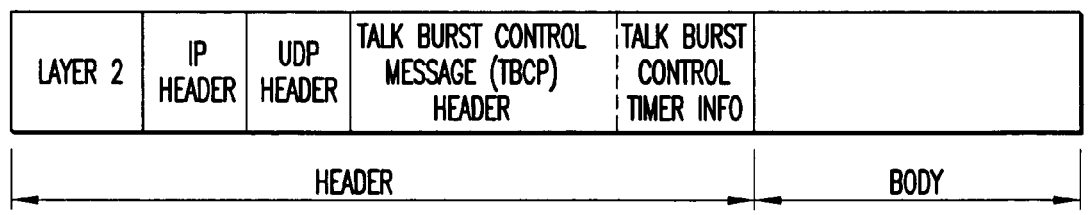
FIGS. 7A and 7B are two different examples of a RTCP message usable in the method of FIG. 6 according to the second embodiment of the present invention.
Figure 7B:
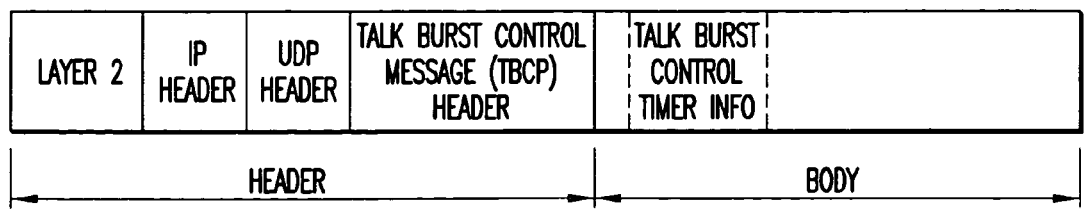

FIG. 3 is a block diagram showing a system for changing a time value of at least one talk burst control timer according to the second embodiment of the present invention. In the second embodiment, the talk burst control timer value(s) are determined by a PT server (or by another server or the application management server authority 50 of FIG. 1) and without the use of a device management server, and are inserted in one of the messages sent from the PT server to the PT client. Such a message may be a session initiation protocol (SIP) message as shown in FIGS. 4-5B or a talk burst control protocol (TBCP) message (e.g., a RTCP message) as shown in FIGS. 6-7B.

Referring to FIG. 3, the system includes at least one PT client 10, and a PT server 20 communicating with the PT client 10 through an entity 35, all operatively coupled. The PT client 10 and the PT server 20 in FIG. 3 generally perform the same functions as the PT client 10 and the PT server 20 of FIG. 1. However, the PT server 20 (or another server or the application management server authority 50 of FIG. 1) determines the new talk burst control timer value(s) and inserts the new timer value(s) in one of its messages to the PT client 10. If another server or the server authority 50 determines the new talk burst control timer value(s), then the determining entity supplies the timer value(s) to the PT server 20 for insertion into the message. The PT client 10 is provided in the mobile terminal 100 which has the talk burst control timers 60 and other known components. The entity 35 includes a network 37 and a SIP/IP core 33. Depending on the nature of a message being communicated between the PT server 20 and the PT client 10, the network 37, the SIP/IP core 33, or other means may be used. For instance, if a SIP message is being communicated between the PT client 10 and the PT server 20, then the SIP/IP core 33 is used. If a TBCP message (e.g., a RTP or RTCP message) is being communicated between the PT client 10 and the PT server 20, then a general network 37 is used. These infrastructures are known.

For each one or more talk burst request timers, a new time value as needed or periodically can be determined or calculated in a variety of different ways. For instance, the PT server 20 (FIG. 3) can periodically or at certain times report its network environment information to the application management server authority 50 of FIG. 1 or to another system or server capable of providing the time value(s). The application management server authority 50 (or another system or server) then can determine the new time value(s) based on the network environment information (and/or other information), and then transmit the determined time value(s) to the PT server 20. The operation of determining the new time value(s) by the server authority 50 has been discussed above in connection with the first embodiment. In another example, the PT server 20 itself can be configured to determine or calculate the new time value(s). This may be done periodically or as needed. The PT server 20 can be computer-programmed to monitor its network conditions or other events, and to determine new time value(s) based on the monitoring results. In one example, if a certain event occurs (e.g., its current load amount exceeds a certain value), then the PT server 20 can be configured to determine new time value(s). The PT server 20 can calculate the new time value(s) that would be optimum under its current conditions, or can merely select or use a value that has been predetermined and designated to be used (e.g., 2 milliseconds or increase the previously set time value by 2, etc.).

Once the PT server 20 has the new time value(s), the PT server 20 then inserts the new time value(s) into a message to be sent to the PT client 10, and transmits the message having the new timer value(s) to the PT client 10. The PT client 10 then updates the value(s) of its talk burst request timer(s) with the new time value(s) appropriately, so that its operations are carried using the new timer value(s). This timer updating operation can be performed continuously, periodically, or as needed.

FIG. 4 is a signal chart showing one example of a method for changing a time value of at least one talk burst control timer according to the second embodiment of the present invention. In this example, a new time value for each one or more talk burst control timers is determined and the determined time value(s) are inserted in one of SIP messages communicated between a PT server and a PT client. The method of FIG. 4 is implemented in the system of FIG. 3, but can be implemented in other suitable system.

Referring to FIG. 4, when the PT client 10 desires to establish a session with the PT server 20, the PT client 10 transmits an INVITE message to the PT server 20 through the SIP/IP core 33 (S21). In response, the PT server 20 transmits a SIP 200 OK message to the PT client 10 through the SIP/IP core 33 (S23). At this time, the SIP 200 OK message includes the new time value(s) of the talk burst control timer(s) that have been determined by the application management server authority 50, the PT server 20, or other server/system as discussed above. That is, the PT server 20 inserts the new time value(s) into a response message responding to the INVITE message.

In the example of FIG. 4, the new time value(s) for the talk burst control timer(s) 60 are inserted in the SIP 200 OK message. However, it can be inserted in a different SIP message such as a SIP 202 ACCEPTED message, a 1800 RINGING message, etc. Also, the new time value(s) for the talk burst control timer(s) 60 can be inserted in a header of the SIP message or in a body of the SIP message. For instance, the new time value of 3, 2 and 1 respectively for the talk burst release timer 64, the talk burst request timer 62, and the PT client end of RTP media timer 66 can be inserted in the header area of the SIP 200 OK message as shown in FIG. 5A, or in the body (session description protocol SDP) part of the SIP 200 OK message as shown in FIG. 5B.

Once the PT client 10 receives the SIP message including the new time value(s) for the talk burst control (TBC) timer(s) 60, it updates the previously-set time values of the talk burst control timer(s) 60 in the PT client 10 appropriately with the new time values, and thereafter is operated using the newly-set talk burst control timers 60 (S25) in the same manner as the first embodiment.

FIG. 6 is a signal chart showing another example of a method for changing a time value of at least one talk burst control timer according to the second embodiment of the present invention. In this example, the new time value(s) for the talk burst control timer(s), which are determined by the PT server 20, the server authority 50 or another system/server as discussed above, are inserted in one of RTCP messages (e.g., TBCP messages) communicated between a PT server and a PT client. That is, this method is used after a session is established between the PT server and the PT client. The method of FIG. 6 is implemented in the system of FIG. 3, but can be implemented in other suitable system.

Referring to FIG. 6, once a session between the PT server 20 and the PT client 10 is established, the PT client 10 transmits a Talk Burst Request message to the PT server 20 through the network 37 (S31). Then the PT server 20 transmits a response message responding to the Talk Burst Request message, which may be, e.g., a Talk Burst Granted message or a Talk Burst Deny message. This response message is a RTCP message (TBCP message) and includes the new time value(s) for one or more talk burst control timers 60 that have been determined by the PT server 20, the server authority 50 (FIG. 1), or other system/server as discussed above. That is, the PT server 20 inserts the new time value(s) into a RTCP message responding to the Talk Burst Request message. The new time value(s) for the talk burst control timer(s) 60 can be inserted in a header of the RTCP message (TBCP message) as shown in FIG. 7A or in a body of the RTCP message (TBCP message) as shown in FIG. 7B.

Once the PT client 10 receives the RTCP message including the new time value(s) for the talk burst control timer(s) 60, the PT client 10 updates the previously-set time value(s) of the talk burst control timer(s) 60 appropriately with the new time value(s). Thereafter the PT client 10 is operated using the newly-set talk burst control timers 60 (S35) in the same manner as the first embodiment.

In the second embodiment of FIGS. 3-7B, the invention is not limited to the use of a SIP message or a TBCP message, and encompasses including the new time value(s) for the talk burst request timer(s) in other message being communicated between a PT client and a PT server.

In all the embodiments of the present invention, the method for changing a time value of at least one talk burst control timer according to the present invention can be applied not only to the talk burst request timer, the talk burst release timer, the PT client retry-after timer, the talk session BYE timer, and the PT client end of RTP media timer, but can be also applied to any kind of timer of a mobile terminal in order to update setting values and parameters of the timers.

As aforementioned, the present invention provides a method and system for changing a time value of a talk burst control timer using a device management server, using a SIP message, or using a RTCP message. The new timer values may be determined with consideration of the network environment change, thereby decreasing a load of the network and enhancing the quality of experience.

Also, in the method and system for changing a time value of a talk burst control timer according to the present invention, a procedure or a basis for changing the time value(s) of the talk burst control timer(s) into optimized value(s) is clearly defined, thereby enhancing the communication reliability and the user's convenience.

Besides, the method and system for changing a time value of a talk burst control timer according to the present invention can be applied not only to the talk burst request timer, the talk burst release timer, the PT client retry-after timer, the talk session BYE timer, and the PT client end of RTP media timer, but can be equally applied to each kind of a timer of a mobile terminal in order to update setting values and parameters of each timer.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a talk burst for at least one PT (push-to) client each having at least one talk burst control timer, the method comprising:
   providing, by a device management server or a PT server, at least one time value for the at least one talk burst control timer, to the at least one PT client; and
   updating the at least one talk burst control timer in the at least one PT client with the at least one time value,
   wherein the providing step includes,
   including the at least one time value in a real-time transport control protocol (RTCP) message, which is to be sent from the PT server to a certain PT client after a session is established between the PT server and the certain PT client, and
   transmitting the RTCP message including the at least one time value from the PT server to the certain PT client, so that at least one talk burst request timer of the certain PT client can be updated with the at least one time value in the updating step, and
   wherein the RTCP message is a talk burst control protocol (TBCP) message.

2. A system for controlling a talk burst, the system comprising:
   a device management server;
   a PT (push-to) server; and
   at least one PT client, each PT client having at least one talk burst control timer and provided in a mobile terminal,
   wherein the at least one PT client receives at least one time value for the at least one talk burst control timer from the device management server or the PT server, and the at least one talk burst control timer in the at least one PT client is updated with the at least one time value,
   wherein the PT server includes the at least one time value in a real-time transport control protocol (RTCP) message, which is to be sent from the PT server to a certain PT client after a session is established between the PT server and the certain PT client, and transmits the RTCP message including the at least one time value from the PT server to the certain PT client, so that at least one talk burst request timer of the certain PT client can be updated with the at least one time value, and
   wherein the RTCP message is a talk burst control protocol (TBCP) message.

* * * * *